(12) United States Patent
Gaetani

(10) Patent No.: US 7,549,502 B2
(45) Date of Patent: Jun. 23, 2009

(54) STEERING DEVICE FOR STEERING WHEELS

(76) Inventor: Angelo Gaetani, Via Donizetti, 11, Civitanova Marche (MC) (IT) I-62012

( * ) Notice: Subject to any disclaimer, the term of this patent is extended or adjusted under 35 U.S.C. 154(b) by 512 days.

(21) Appl. No.: 10/566,281

(22) PCT Filed: Aug. 2, 2004

(86) PCT No.: PCT/IB2004/002465
§ 371 (c)(1), (2), (4) Date: Mar. 21, 2006

(87) PCT Pub. No.: WO2005/009826
PCT Pub. Date: Feb. 3, 2005

(65) Prior Publication Data
US 2006/0213698 A1    Sep. 28, 2006

(30) Foreign Application Priority Data
Jul. 31, 2003   (IT) .................... MO2003A0223

(51) Int. Cl.
*B62D 7/00* (2006.01)
(52) U.S. Cl. ............... 180/411; 180/6.5; 180/253; 180/11; 180/12; 180/13
(58) Field of Classification Search ............ 180/6.5, 180/253, 411, 11, 12, 13
See application file for complete search history.

(56) References Cited

U.S. PATENT DOCUMENTS 3,587,767 A    6/1971  Gamaunt 4,683,973 A * 8/1987 Honjo et al. ............ 180/252
6,408,230 B2 * 6/2002 Wada ...................... 701/1

FOREIGN PATENT DOCUMENTS

| DE | 91 03 467 U | 5/1991 |
| EP | 0 716 974 A1 | 6/1996 |
| EP | 0 741 069 A2 | 11/1996 |
| EP | 1 426 203 A1 | 6/2004 |

OTHER PUBLICATIONS

International Search Report of PCT/IB2004/002465, mailed Dec. 6, 2004.

* cited by examiner

*Primary Examiner*—Paul N Dickson
*Assistant Examiner*—Michael R Stabley
(74) *Attorney, Agent, or Firm*—Nixon & Vanderhye P.C.

(57) ABSTRACT

A steering apparatus for steering wheels (1) of a vehicle (2) comprises support means (4) arranged for supporting said wheels (1), driving means (27) arranged for rotating said support means (4) around respective longitudinal axis means (Z) and connecting means arranged for connecting said driving means (27) with said support means (4), said connecting means comprising transmission gear means (26); a vehicle comprises steered wheel means (1) and steering means (3) arranged for controlling said steered wheel means (1), said steering means (3) comprising support means (4) arranged for supporting said steered wheel means (1), driving means (27) arranged for rotating said support means (4) around respective longitudinal axis means (Z) and connecting means arranged for connecting said driving means (27) with said support means (4), said connecting means comprising transmission gear means (26).

21 Claims, 6 Drawing Sheets

STEERING DEVICE FOR STEERING WHEELS

This application is the US national phase of international application PCT/IB2004/002465, filed 2 Aug. 2004, which designated the U.S. and claims priority of IT MO2003A000223, filed 31 Jul. 2003, the entire contents of each of which are hereby incorporated by reference.

The present invention relates to a steering apparatus for a vehicle, particularly a vehicle for the inside transport, such as a lift truck.

In EP 0741069 four wheels provided lift trucks are disclosed comprising a pair of front driving wheels and a pair of rear steering wheels, such rear steering wheels being each supported by a respective supporting element.

Such lift trucks further comprise a steering apparatus, associated with said rear steering wheels, which comprises a mechanism, for example a system of articulated bars, provided with end bars, each of which is adapted so as to force one of said support elements to perform an oscillation of predetermined amplitude around a substantially vertical axis.

The system of bars, for example driven by a hydraulic cylinder, controls the rotation of the support elements of the rear steering wheels, enabling these latter to rotate around one or the other direction.

A disadvantage of the known apparatuses is that said mechanism can reach a dead centre configuration in which a further stress imposed on the bars by the hydraulic cylinder can also not produce a respective rotation of the support elements of the wheels in the desired direction, which can also results in blocking the mechanism itself.

Consequently, the mechanism can damage itself and can further damage parts of the vehicle against which the bars, forming the mechanism itself, impact following an anomalous rotation.

In order to prevent the previous described disadvantage, the mechanism is driven so that, in operation, it does not reach said dead centre.

However, this implies that it is impossible to obtain very reduced turning radii.

In other words, with the known systems it can occur that the actual turning centre does not correspond to the intersection between the axis of the front wheels and the longitudinal plane of symmetry of the vehicle, but said actual centre of turning is actually contained in the half plane identified by the axis of the front wheels and not comprising the rear wheels.

It is an object of the invention to improve the steering apparatuses for a vehicle, in particular for a lift truck.

A further object is to obtain a steering apparatus that enables a rotation of the steering wheels having any amplitude.

A further object is to obtain a steering apparatus that does not result blocked as a consequence of an anomalous positioning of levers with which it is provided.

In a first aspect of the invention, a steering apparatus is provided for steering wheels of a vehicle, comprising support means arranged for supporting said wheels, driving means arranged for driving said support means to be rotated around respective longitudinal axis means and connecting means arranged for connecting said driving means with said support means, characterised in that said connecting means comprises transmission gear means.

Owing to the invention, a steering apparatus can be obtained that enables the wheels to perform rotations of any amplitude, without involving blocking, or even breaking, of the apparatus itself.

In a version, the transmission gear means comprises ring gear means connected with the driving means and co-operating with pinion means associated with the supporting means of the wheels.

In particular, by properly dimensioning the ring gear means and the pinion means, a rotation of limited amplitude of the ring gear means implies a rotation of remarkable amplitude of the pinion means and, consequently, of the wheels connected thereto.

In that case, when the ring gear means are actuated by lever mechanisms, these latter can be driven so as to operate by maintaining themselves in safety conditions, i.e. without reaching a dead centre of operation.

In a second aspect of the invention, a vehicle is provided comprising steered wheel means and steering means arranged for controlling said steered wheel means, said steering means comprising support means arranged for supporting said steered wheel means, driving means arranged for driving said support means to be rotated around respective longitudinal axis means and connecting means arranged for connecting said driving means with said support means, characterised in that, said connecting means comprises transmission gear means.

Owing to this aspect of the invention, a vehicle can be obtained provided with a limited turning radius.

In a version, the steered wheel means comprises a pair of steered wheels, each of which driven by respective driving means.

Thus, a vehicle can be obtained provided with independent steered wheels.

The invention will be better understood and carried out with reference to the enclosed drawings, that illustrate some exemplifying and not restrictive embodiments thereof, wherein.

Figure 1:
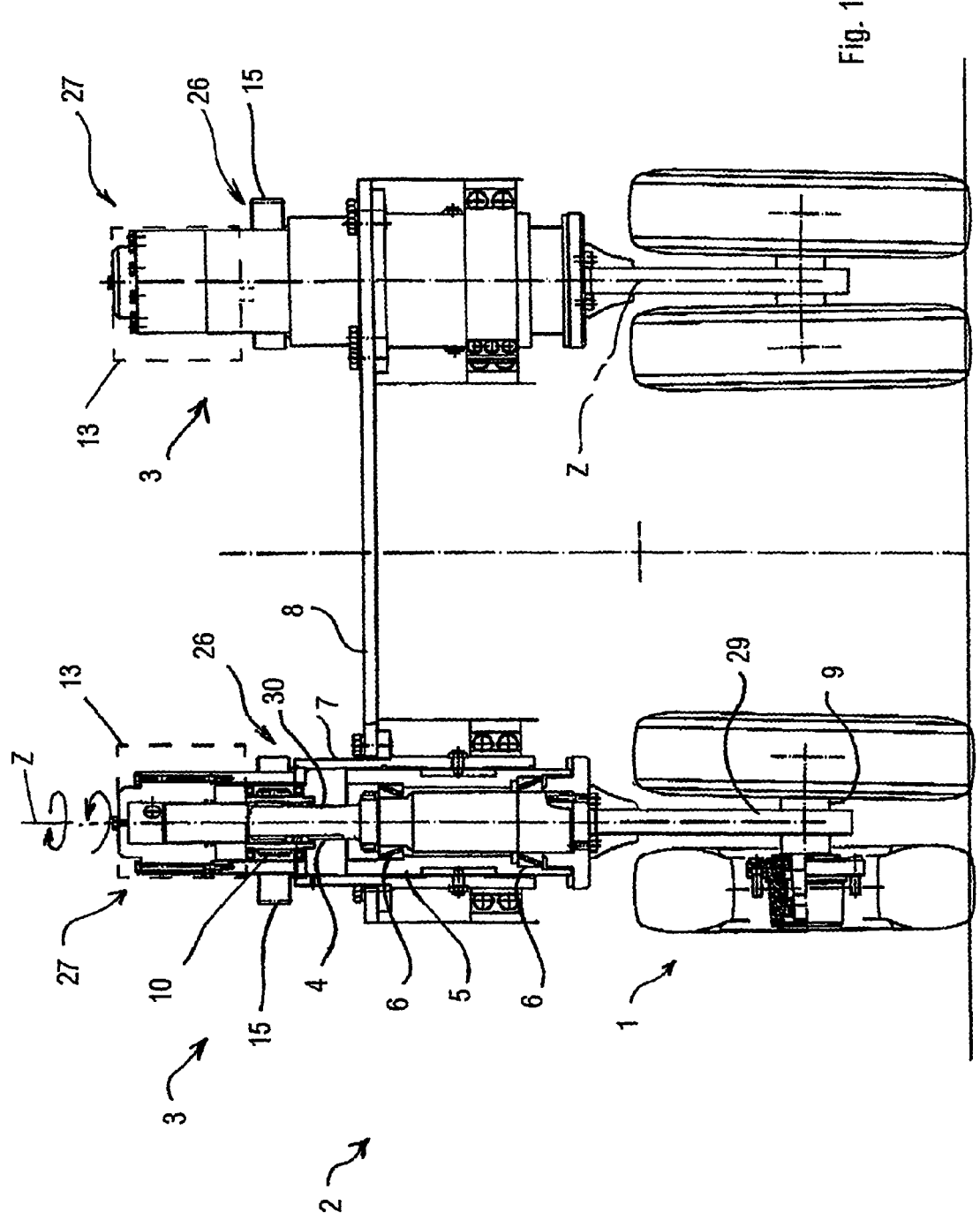
FIG. 1 is a front view of steered wheels of a vehicle with which a steering apparatus according to the invention is associated.
Figure 2:
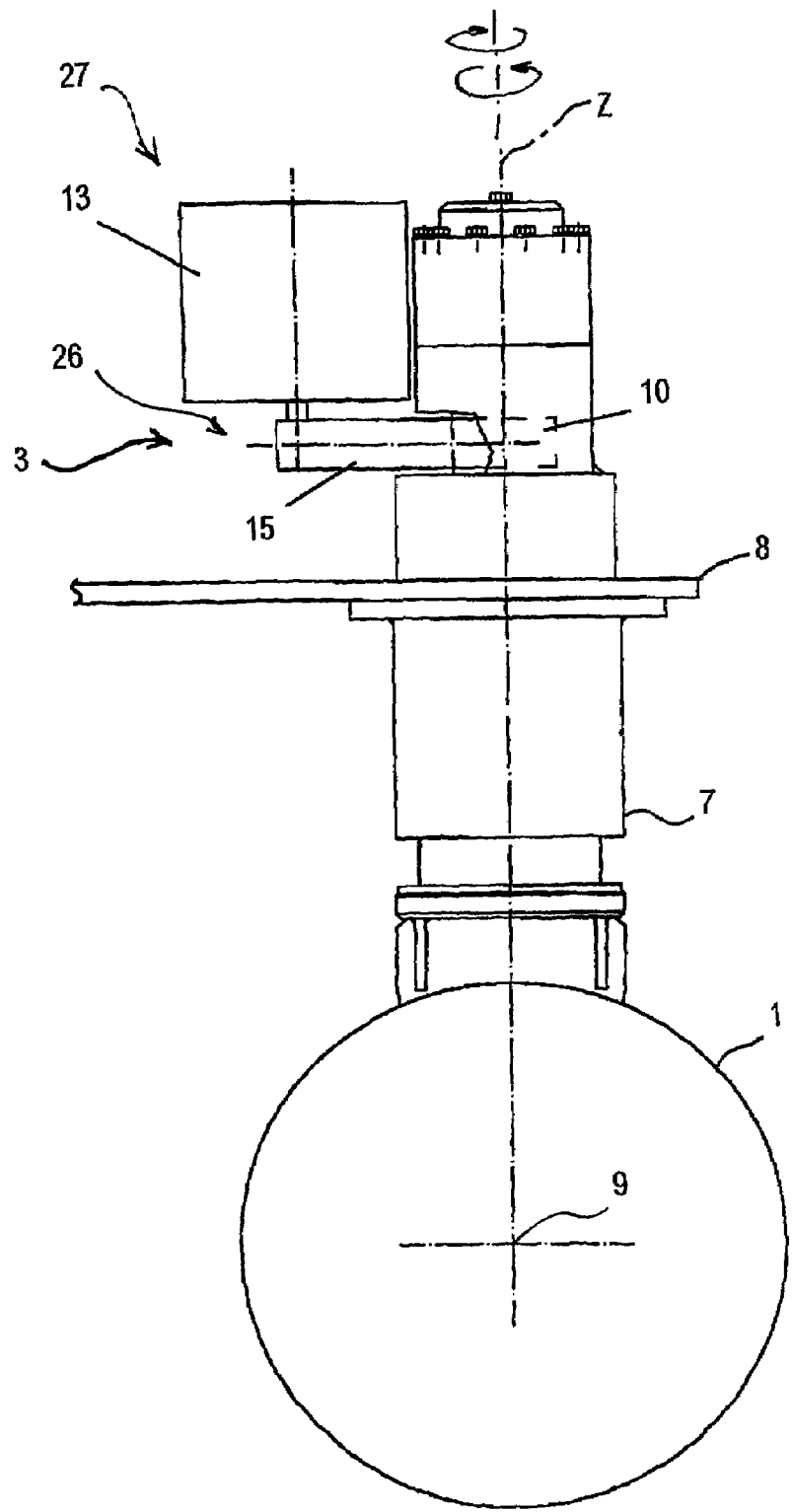
FIG. 2 is a schematic side view of a wheel with which a steering apparatus according to the invention is associated.

With reference to FIGS. 1, 2, 3 and 4, a lift truck 2 is shown provided with steered wheels 1 with which a steering apparatus 3 according to the invention is associated.

Each wheel 1 is connected with a stem 4 having substantially vertical longitudinal axis Z.

Each stem 4 can be driven to rotate around the Z axis in both directions in order to enable steering of the wheel 1 connected thereto.

Stem 4 is supported by angular contact bearings 6 mounted within a support 5 that can be translated in the direction of the axis Z within a sleeve 7 rigidly connected with the frame 8 of the lift truck 2.

The stem 4, the support 5 and the sleeve 7 define, as a whole, a double-acting hydraulic cylinder suitable for receiving pressurised oil. As disclosed in EP 0741069, the cylinder associated with one steered wheel is hydraulically connected, via conduits not shown, with the cylinder associated with the other steered wheel.

Consequently, the pressurised oil exiting one hydraulic cylinder is forced to enter the other hydraulic cylinder.

This enables to prevent instability problems of the lift truck 2 caused by possible terrain unevenness whereon wheels 1 are moving.

In particular, the movement of each of the supports 5 within the respective sleeve 7, enables the frame 8 to be maintained roughly at a same height from the terrain also in the presence of depressions.

At an end 29 of the stem 4 a wheel hub 9 is connected that may be either of the type for a single wheel or for twin wheels, wherein two wheels are mounted on the same hub as shown in FIG. 1.

The steering apparatus 3 comprises transmission gear means 26 associated with each stem 4 and configured so as to drive turning of said wheel.

Such transmission gear means 26 comprises a pinion 10, mounted on a further end 30 of the stem 4, opposite the end 29, by means of a coupling of known type, for example through a key.

The transmission gear means 26 further comprises a sector gear 15 that engages with the pinion 10. The sector gear 15 can be driven to rotate around a pivot 12 connected with the frame 8, such pivot 12 having longitudinal axis substantially parallel to the axis Z.

The lift truck 2 is further provided with driving means 27 comprising a pair of motors 13, for example electrical motors provided with proper reducers, each of which arranged for driving a sector gear 15.

Alternatively, hydraulic motors may be provided in place of the electrical motors 13.

The lift truck 2 is further provided with an electronic control unit that controls the operation of the pair of motors 13, so as to coordinate the rotation of the wheels 1.

Alternatively, the transmission gear means 26 may comprise gears of known type, such as spur gears, helical gears, straight bevel gears, spiral bevel gears, curbed-tooth gears, hypoid gears.

In particular, depending on the case, the axes of the wheels of said gears may be parallel, concurrent, or non-intersecting.

In a version, not shown, the transmission gear means 26 comprises a worm co-operating with a gear element.

In particular, the worm may be driven by the driving means 27 and may engage with the gear element associated with the stem 4.

In a version not shown, the steering apparatus 3 may be associated with the steered wheel, for example the rear wheel, of a three-wheel vehicle.

Figure 4:
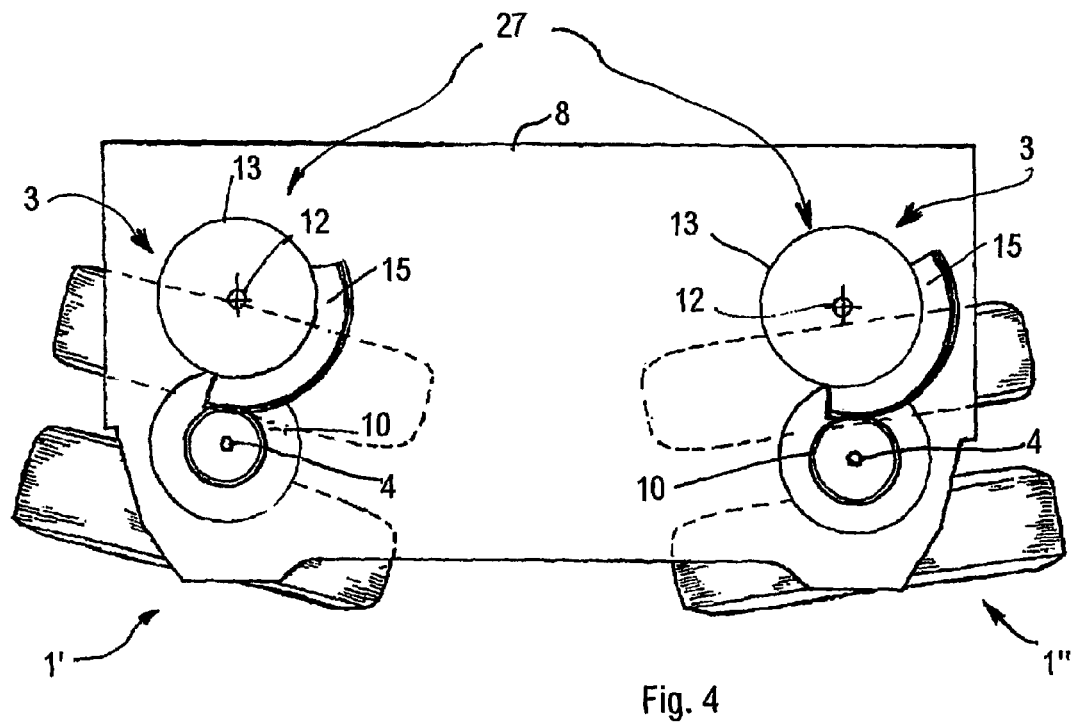
FIG. 4 is a view like FIG. 3 in which the steered wheels are arranged in a configuration where the vehicle shows the minimal turning radius.
Figure 5:
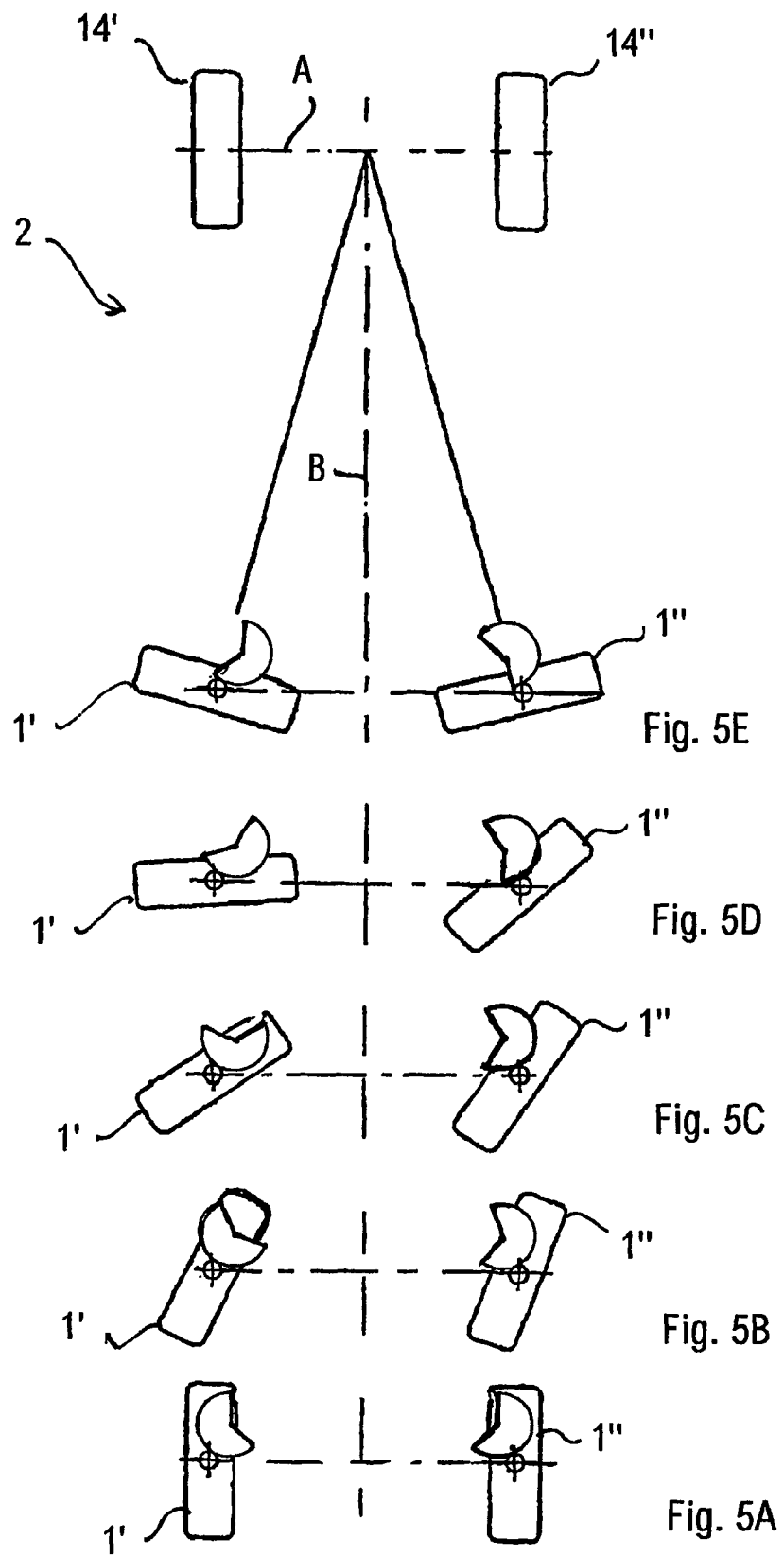
FIGS. 5A to 5E are schematic plan views of a four-wheel vehicle with the rear wheels of which a steering apparatus according to the invention is associated, with steered wheels in a position progressively varying between the position in which the wheels are not steered and the position of minimal turning radius.

In the FIGS. 4 and 5E, the configuration of maximal steering of the lift truck is shown, i.e. the configuration of minimum turning radius.

The lift truck 2 is provided with two front driving wheels 14' and 14", mounted on a transversal front axis A of the lift truck 2, and two rear steered wheels 1' and 1".

Maximal steering of the lift truck 2 is obtained when the centre of rotation of the lift truck 2 lies on the longitudinal middle plane B of the lift truck 2 itself, at the intersection point between the middle plane B of the truck and the front transversal axis A.

FIGS. 5A to 5E show the positions that can be taken by the rear steered wheels 1' and 1" in order to meet the configuration of maximal steering, by starting from a configuration of rectilinear motion in which the steered wheels 1' and 1" are positioned parallel to the middle plane B.

Figure 3:
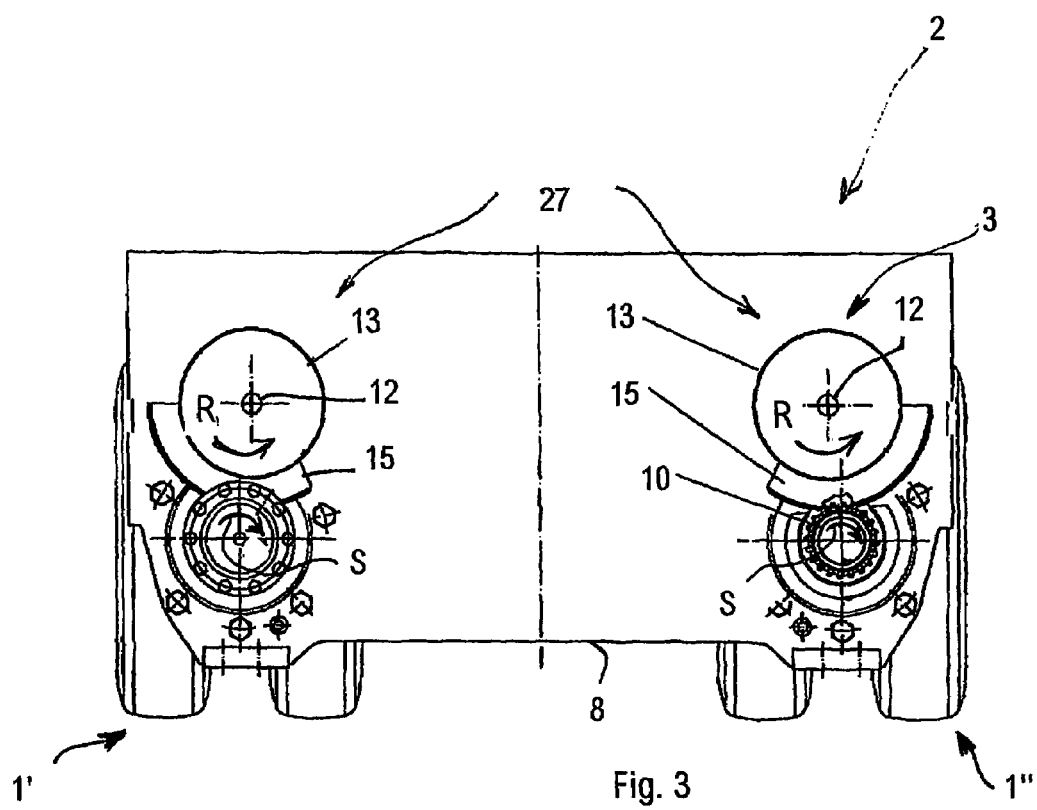
FIG. 3 is a schematic plan view of the steering apparatus of FIG. 1.

In order to pass from the configuration of rectilinear motion shown in the FIGS. 3 and 5A to the configuration of maximal steering shown in the FIGS. 4 and 5E, the sector gears 15 are rotated in the direction indicated by the arrows R and, consequently, the steered wheels 1' and 1" are rotated in the direction of the arrows S.

Figure 6:
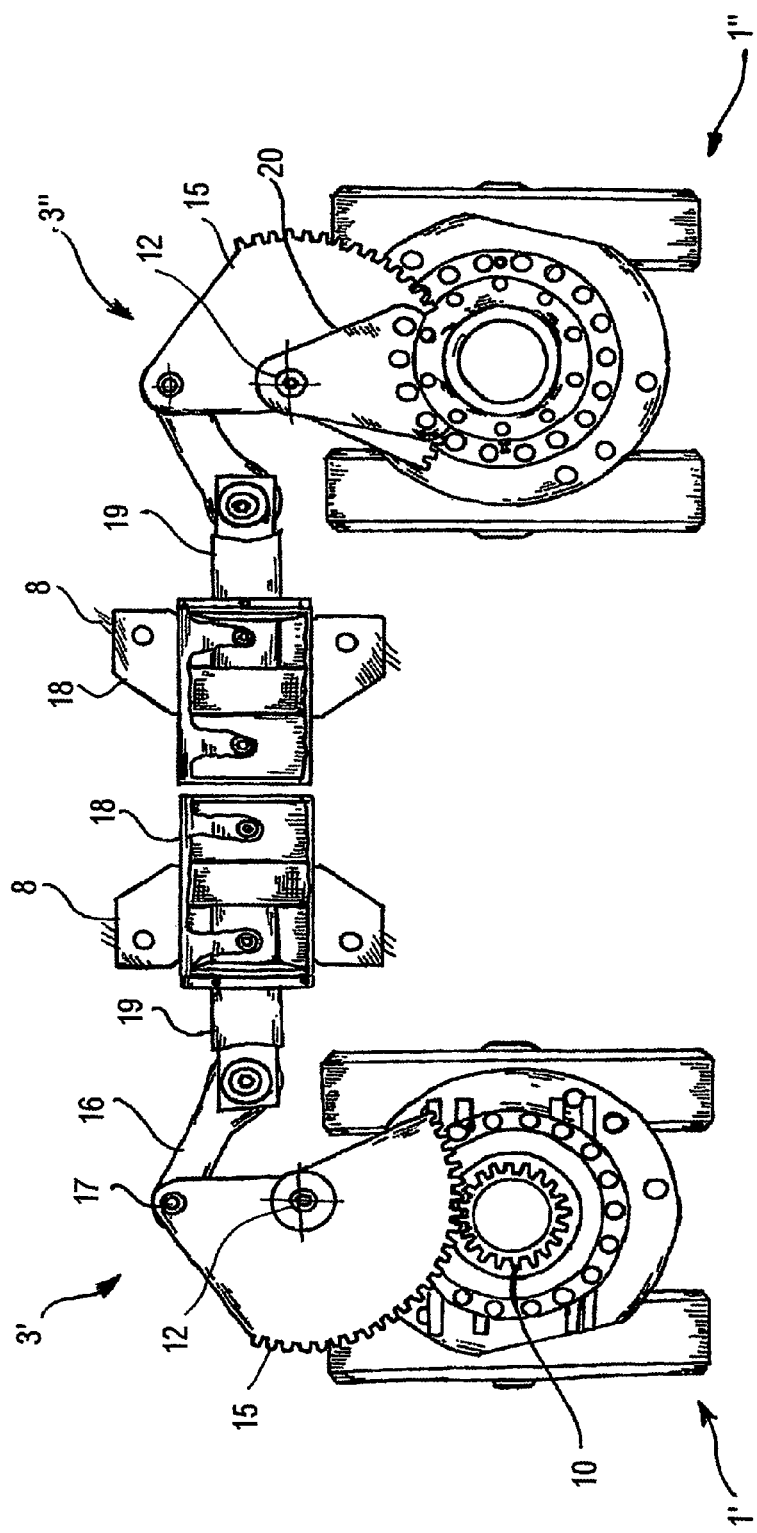
FIG. 6 is a plan view of a version of the steering apparatus associated with a pair of steered wheels of a vehicle.

In FIG. 6 a version of the steering apparatus 3 is shown in which the pinion 10 engages with a sector gear 15, which is driven to rotate around the pivot 12 by means of link means.

Such link means comprises a connecting rod 16 having one end pivotally connected with the sector gear 15 by means of a further pivot 17 and a further end, opposite said one end, pivotally connected with stem means 19 of a cylinder 18, for example a hydraulic cylinder, anchored to the frame 8. The pivot 12 is held in a fixed position with respect to the frame 8 by means of a plate 20 fixed to the sleeve 7.

The steered wheels 1' and 1" are provided with respective steering apparatuses 3' and 3", operating in an independent manner, each being controlled by the respective cylinder 18.

Figure 7:
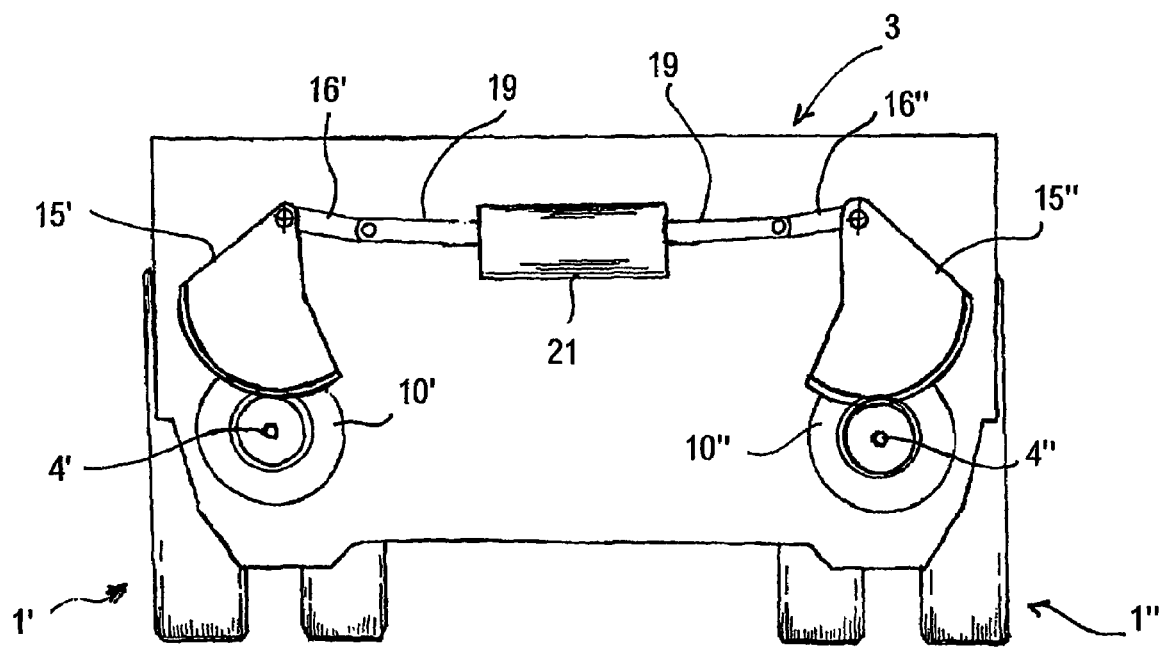
FIG. 7 is a plan view of a further version of the steering apparatus associated with a pair of steered wheels of a vehicle.
Figure 8:
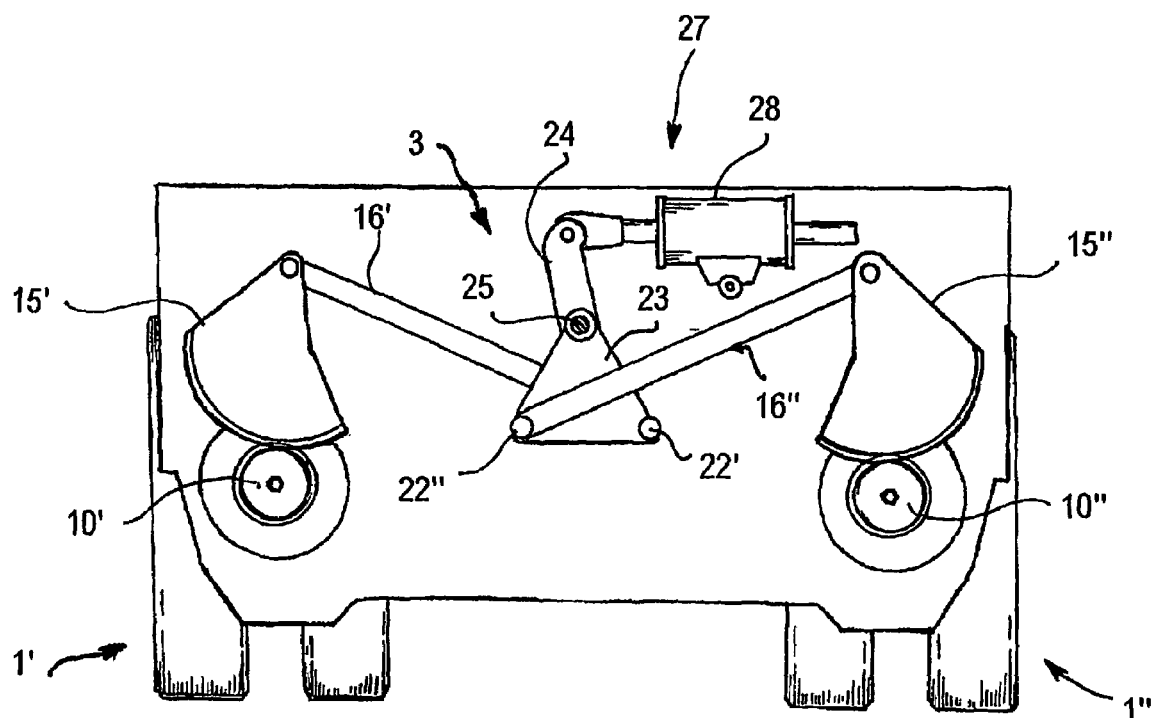
FIG. 8 is a plan view of a still further version of the steering apparatus associated with a pair of steered wheels of a vehicle.

FIGS. 7 and 8 show other versions of the steering apparatus 3, which controls at the same time both steered wheels 1' and 1".

The steering apparatus 3 is in fact provided with link means that connects sector gears 15' and 15", that engage with respective pinions 10' and 10" each of which mounted on a respective stem 4' and 4".

In the version of FIG. 7, each sector gear 15' and 15" is pivotally connected with a respective connecting rod 16' and 16".

The connecting rod 16' is pivotally connected with one end of connecting rod means 19 of a double-acting cylinder 21, whereas the connecting rod 16" is pivotally connected with a further end of the connecting rod means 19, opposite said one end, such one and further ends extending at opposite sides of the double-acting cylinder 21.

The cylinder 21 is anchored to the frame 8 in a symmetrical position with respect to the central plane B of the lift truck 2.

As shown in EP 0741069, the double-acting cylinder 21 can oscillate with respect to the frame 8, so as to follow the translation of the stems 4' and 4", along the direction of the axis Z.

With reference to FIG. 8, the link means receive the motion from an actuator 28 and transfer it to the sector gears 15' and 15" in order to steer the wheels 1' and 1".

The link means comprises a system of levers 22 with crossed arms, in which the connecting rods 16' and 16" cross themselves and are articulated, around axes parallel to the axis Z, with respective hinges 22' and 22", obtained in a triangular connecting plate 23 rotating around a fulcrum 25 fixed with the frame 8.

The actuator 28 acts on an arm 24 that is rigidly coupled with the triangular connecting plate 23.

The connection between the driving means 27 and the sector gears 15', 15" can be achieved by using any of the constructive versions of the link means disclosed in EP 0741069.

The invention claimed is:

1. Steering apparatus for a steering wheel of a vehicle, comprising a support arranged to support said wheels, a linear drive arranged to rotate said support around a respective longitudinal axis and connecting structure arranged to connect said drive with said support, said drive comprising an actuator, said connecting structure comprising a transmission gear which comprises a gear wheel associated with said support and a further gear wheel connected with said drive and engaging with said gear wheel, wherein said further gear wheel has a pitch diameter greater than the pitch diameter of said gear wheel.

2. Apparatus according to claim 1, wherein said gear wheel and said further gear wheel have respective axes of rotation mutually parallel.

3. Apparatus according to claim 1, wherein said gear wheel and said further gear wheel have respective axes of rotation mutually concurrent.

4. Apparatus according to claim 1, wherein said gear wheel and said further gear wheel have respective axes of rotation mutually non-intersecting.

5. Apparatus according to claim 1, wherein said further gear wheel comprises a sector gear.

6. Apparatus according to claim 1, wherein said connecting structure further comprises a link arranged to connect said actuator with said further gear wheel.

7. Apparatus according to claim 6, wherein said link comprises a lever pivotally connected with said further gear wheel in an eccentric position.

8. Vehicle, comprising at least one steering wheel and a steering unit arranged for controlling said steering wheel, said steering unit comprising a support arranged to support said steering wheel, a linear drive arranged to rotate said support around a respective longitudinal axis and connecting structure arranged to connect said drive with said support, said drive comprising an actuator, said connecting structure comprising a transmission gear which comprises a gear wheel associated with said support, and a further gear wheel connected with said drive and engaging with said gear wheel, wherein said further gear wheel has a pitch diameter greater than the pitch diameter of said gear wheel.

9. Vehicle according to claim 8, wherein said gear wheel and said further gear wheel have respective axes of rotation mutually parallel.

10. Vehicle according to claim 8, wherein said gear wheel and said further gear wheel have respective axes of rotation mutually concurrent.

11. Vehicle according to claim 8, wherein said gear wheel and said further gear wheel have respective axes of rotation non-intersecting.

12. Vehicle according to claim 8, wherein said further gear wheel comprises a sector gear.

13. Vehicle according to claim 8, wherein said steering wheel comprises a first steering wheel and a second steering wheel.

14. Vehicle according to claim 8, wherein said connecting structure further comprises a link arranged for connecting said actuator with said further gear wheel.

15. Vehicle according to claim 14, wherein said link comprises a lever pivotally connected with said further gear wheel in an eccentric position.

16. Vehicle according to claim 8, wherein said steering wheel comprises a first steering wheel and a second steering wheel, said actuator comprising a first actuator associated with said first steering wheel and a second actuator associated with said second steering wheel.

17. Vehicle according to claim 16, and further comprising an electronic command and control unit arranged to actuate said first actuator and said second actuator so as to coordinate the relative rotation of said first steering wheel and said second steering wheel.

18. Vehicle according to claim 14, wherein said steering wheel comprises a first steering wheel and a second steering wheel, said actuator comprising an actuator suitable for simultaneously controlling, via said link, said first steering wheel and said second steering wheel.

19. Vehicle, comprising at least one steering wheel and a steering unit arranged for controlling said steering wheel, said steering unit comprising a support arranged to support said steering wheel, a drive arranged to rotate said support around a respective longitudinal axis and connecting structure arranged to connect said drive with said support, said connecting structure comprising a transmission gear which comprises a gear wheel associated with said support, and a further gear wheel connected with said drive and engaging with said gear wheel, wherein said further gear wheel has a pitch diameter greater than the pitch diameter of said gear wheel, said steering wheel comprising a first steering wheel and a second steering wheel, said drive comprising a motor which comprises a first motor associated with said first steering wheel and a second motor associated with said second steering wheel, an electronic command and control unit being arranged for actuating said first motor and said second motor so as to coordinate the relative rotation of said first steering wheel and said second steering wheel.

20. Vehicle according to claim 19, wherein said motor comprises an electric motor.

21. Vehicle according to claim 19, wherein said motor comprises an hydraulic motor.

* * * * *